US012570863B2

(12) United States Patent
Thottathil et al.

(10) Patent No.: US 12,570,863 B2
(45) Date of Patent: Mar. 10, 2026

(54) CATALYST-CONTAINING POLYMER COATINGS FORMED BY CHEMICAL GRAFTING

(71) Applicant: Catalytic Industrial Group, Inc., Independence, KS (US)

(72) Inventors: Paul Thottathil, New Hyde Park, NY (US); Satyabrata Mukherjee, Westbury, NY (US); Purushothaman Kesavan, Franklin Square, NY (US); John Ryan, Bellmore, NY (US)

(73) Assignee: Catalytic Industrial Group, Inc., Independence, KS (US)

( * ) Notice: Subject to any disclaimer, the term of this patent is extended or adjusted under 35 U.S.C. 154(b) by 668 days.

(21) Appl. No.: 17/964,302

(22) Filed: Oct. 12, 2022

(65) Prior Publication Data

US 2023/0119478 A1 Apr. 20, 2023

Related U.S. Application Data

(60) Provisional application No. 63/255,075, filed on Oct. 13, 2021.

(51) Int. Cl.

| | |
|---|---|
| ***C09D 7/61*** | (2018.01) |
| ***C09D 4/00*** | (2006.01) |
| ***F23D 14/18*** | (2006.01) |

(52) U.S. Cl.
CPC ................. *C09D 7/61* (2018.01); *C09D 4/00* (2013.01); *F23D 14/18* (2013.01)

(58) Field of Classification Search
CPC ...... C09D 127/16; C09D 151/08; H01B 1/20; A01M 1/02; C08L 27/06
See application file for complete search history.

(56) References Cited

U.S. PATENT DOCUMENTS

| | | | | | |
|---|---|---|---|---|---|
| 3,944,689 | A * | 3/1976 | Luckock | C09D 133/06 | 427/388.5 |
| 11,492,510 | B2 * | 11/2022 | Cassaday | C09D 151/08 | |
| 2006/0260183 | A1 * | 11/2006 | Hockaday | A01M 1/02 | 43/132.1 |
| 2007/0096066 | A1 * | 5/2007 | Yoshida | H01B 1/20 | 252/511 |

FOREIGN PATENT DOCUMENTS

| | | | | |
|---|---|---|---|---|
| EP | 0708143 | A1 * | 4/1996 | C08L 27/06 |

* cited by examiner

*Primary Examiner* — Dah-Wei D. Yuan
*Assistant Examiner* — Andrew J Bowman
(74) *Attorney, Agent, or Firm* — Hovey Williams LLP

(57) ABSTRACT

The present invention relates to coating compositions and methods of forming catalyst-containing coatings on substrates for catalytic heater devices. The coatings are formed by a chemical grafting method, which chemically bonds the coating (and catalysts contained therein) to the substrate. The resulting coatings have high temperature resistance and inhibit or prevent catalyst migration to the substrate, thereby maintaining catalytic activity and desired temperatures over prolonged use.

10 Claims, No Drawings

CATALYST-CONTAINING POLYMER COATINGS FORMED BY CHEMICAL GRAFTING

RELATED APPLICATIONS

The present application claims the priority benefit of U.S. Provisional Patent Application Ser. No. 63/255,075, filed Oct. 13, 2021, entitled CATALYST-CONTAINING POLYMER COATINGS FORMED BY CHEMICAL GRAFTING, and is incorporated by reference herein in its entirety.

BACKGROUND OF THE INVENTION

Field of the Invention

The present invention relates to coating compositions comprising catalytic materials, methods of coating substrates with such compositions, for example using chemical grafting, and the resulting articles comprising the coated substrates, which may be used for catalytic heating and/or drying applications.

Description of Related Art

Catalytic heaters, such as flameless, gas-fired catalytic heaters generally comprise heating elements capable of effecting the flameless catalytic combustion of gasses flowing through or past the elements. The catalyst materials can be supported on a catalyst substrate, such as a heater pad, with a coating (washcoat) applied thereon that acts as a carrier for the catalytic materials. The catalyst material may include a precious metal or metal-containing compound adhered to the substrate, for example, in a traditional coating material. However, after prolonged use at high temperatures, the catalytic materials tend to migrate from the surface of the coating toward the heater pads and may cause the temperature of the heater pads to fall (due to reduced catalytic activity). Thus, there is a need for improved compositions and coating methods that inhibit or prevent migration of catalytic materials on the substrate surface.

SUMMARY OF THE INVENTION

The present invention is broadly concerned with coating compositions for application to catalytic support substrates, such as fiber-based heater pads, that are capable of inhibiting or preventing migration of catalyst materials toward the heater pads in catalytic heater systems. The catalytic coating is generally applied by a chemical grafting method, yielding a catalytic coating with a lower tendency for the catalyst materials to migrate at high temperatures, thereby making the catalyst less prone to aging after prolonged use. Also disclosed are catalytic heaters comprising the coated heater pad substrates, which have favorable properties as compared to catalytic heaters having catalytic coating deposited onto the substrates using traditional solution chemistry.

In one embodiment, there is provided a method of forming a catalyst-containing polymer coating on a catalytic heater substrate. The method comprises providing a liquid coating composition comprising: a washcoat base comprising a catalyst material; and a chemical grafting admixture comprising one or more monomers and/or prepolymers, one or more grafting initiators, and one or more coupling agents dispersed or dissolved in a solvent system. The method further comprises applying the liquid coating composition to a surface of the substrate and forming the catalyst-containing polymer coating thereon.

In another embodiment, there is provided a catalytic heater comprising a catalyst-containing polymer coating chemically bonded to a substrate. The polymer coating comprises a polymer matrix comprising a catalyst material secured therein.

In another embodiment, there is provided a composition useful for forming a catalyst-containing polymer coating on a substrate. The composition comprises: a washcoat base comprising a catalyst material; and a chemical grafting admixture comprising one or more monomers and/or prepolymers, one or more grafting initiators, and one or more coupling agents dispersed or dissolved in a solvent system.

DETAILED DESCRIPTION

The present invention is concerned with improved coating compositions and methods of forming catalyst-containing polymer coatings onto substrates, such as the heater pads of catalytic heaters. The compositions generally comprise a washcoat base comprising a catalyst material and an admixture comprising one or more monomers and/or prepolymers, one or more grafting initiators, and one or more coupling agents dispersed or dissolved in a solvent system. Other components or additives may also be included in the composition as needed or desired. The catalytic coating is generally prepared and provided as a liquid composition. The composition is then applied to the substrate (e.g., heater pad) to form a catalyst-containing polymer coating. The coating is preferably formed, for example, using a chemical grafting method. The resulting polymeric film (coating) is chemically bonded to the substrate, rather than merely physically adhered, which imparts the advantageous properties described herein.

Compositions

As noted above, the compositions according to embodiments of the present invention generally comprise a washcoat base comprising a catalyst material and an admixture. The admixture can be combined with the washcoat base and included at about 0.1% to about 5%, or about 0.5% to about 3% by weight, based on the total weight of the composition (including base and admixture) taken as 100% by weight.

Catalyst-Containing Washcoat Base

The washcoat base generally comprises a catalyst material, which can include a precatalyst material, dissolved, dispersed, or suspended in a liquid carrier. One or more additives may be included in the washcoat base to impart desired or necessary characteristics for the particular application.

The catalyst material provides an important function in catalytic heater operation. When a fuel (e.g., natural gas) and oxygen combine together in the presence of the catalyst material, the fuel and oxygen ignite and react at much lower temperatures than non-catalyzed combustion, and thus no flame is produced. In certain embodiments, the catalyst material comprises one or more precious metals and/or precious metal-containing compounds. In certain embodiments, the catalyst material comprises a metal or metal-containing compound comprising platinum, palladium, and/or rhodium. Platinum may be used as both an oxidation and reduction catalyst. Palladium may be used primarily as an oxidation catalyst. Rhodium may be used primarily as a reduction catalyst. When the catalyst material comprises a precatalyst material or metal-containing compound, the catalyst material may be in the form of a compound dispersed or suspended in a liquid carrier and/or a salt dissolved in solution. For example, in certain embodiments, the catalyst material comprises a platinum-containing salt, such as a hexachloroplatinate salt (e.g., sodium hexachloroplatinate, potassium hexachloroplatinate, etc.).

The liquid carrier may comprise any liquid suitable for dissolving, dispersing, or suspending the catalyst material. In certain embodiments, the liquid carrier may comprise an organic solvent and/or inorganic solvent. In certain embodiments, the liquid carrier may comprise water, methanol, and/or glycerin (glycerol).

Additives may also be included in the washcoat base to impart desirable properties into the composition. For example, in certain embodiments, the base may comprise one or more surface modifiers, rheology modifiers, and/or fillers. For example, in certain embodiments, additive(s) may be included to provide a rust-resistant surface on the coating. In certain embodiments, additive(s) may be included to form a rough irregular surface in the polymer coating, which can increase the surface area for the fuel and oxygen to contact the catalyst, thereby increasing catalytic activity. An exemplary additive includes RINSITE by Chemetall.

The amount of catalyst material, liquid carrier, and any additives may be included in the washcoat base as needed or desired, and may vary depending on the particular components used and the particular application. In certain embodiments, the catalyst material, liquid carrier, and any additives are included in appropriate amounts so as to provide a stable solution, dispersion, or suspension. In certain embodiments, the "stable" solution, dispersion, or suspension means that there are no precipitated or settled solids at least 1 day, at least 2 days, at least 5 days, at least 10 days, at least 1 month, at least 6 months, or at least 1 year after dissolving, dispersing, or suspending the catalyst material in the liquid carrier.

Grafting Admixture

The grafting admixture generally comprises one or more monomers and/or prepolymers, one or more grafting initiators, and one or more coupling agents dispersed or dissolved in a solvent system. One or more grafting regenerators, surfactants, and other additives may also be included as needed or desired.

The one or more monomers and/or prepolymers act as the building blocks of the polymer matrix of the coating. Thus, the monomers and/or prepolymers are polymerized upon application of the coating composition to the substrate and initiation of the chemical grafting process described below. A variety of monomers and/or prepolymers may be used in accordance with embodiments of the present invention. However, in certain embodiments, the monomers comprise vinyl, epoxy, and/or acrylic monomers. Additionally, in certain embodiments, the one or more monomers and/or prepolymers comprise hydroxyl, chloro, carboxyl, or glycidyl groups. The use of monomers is particularly advantageous compared to traditional polymer coating compositions. Since monomers are much smaller and lighter than polymers, they can penetrate into and react with deeper sites on the substrate surface during chemical grafting, as described herein. In certain embodiments, the admixture comprises about 0.01% to about 1%, or about 0.1% to about 0.5% by weight of the one or more monomers and/or prepolymers.

The one or more graft initiators are used to react with the surface of the substrate to expose active sites for monomer/prepolymer grafting and polymerization. In certain embodiments, the one or more graft initiators comprise one or more metallic salts. In certain embodiments, the one or more graft initiators comprise one or more metallic salts selected from the group consisting of silver nitrate, silver perchlorate, ferrous ammonium sulfate, silver acetate, copper acetate, and combinations thereof. The graft initiators are generally included in relatively small amounts. In certain embodiments, the admixture comprises about 0.1 to about 100 ppmw of the one or more graft initiators.

The one or more coupling agents generally act as molecular bridges at the interface between differing components, such as the polymer matrix, substrate fibers, catalyst materials, and/or filler materials. Without being bound by any theory, polyfunctional monomer coupling agents are believed to be bonded to ceramic or glass fiber substrates via hydroxyl hydrogen on the surface of the substrates. Additionally, it is believed that coupling agents comprising two or more amino groups react with, and bond to, functional groups on a catalyst/precatalyst material (e.g., hexachloro groups) and the hydroxyl hydrogen of the fiber substrate. Thus, in certain embodiments, the coupling agents comprise one or more polyfunctional monomers. In certain embodiments, the coupling agents comprise two or more amino groups. Moreover, it is believed that titanium-containing, or titanium-derived, coupling agents react with free protons and increase adhesion, which may reduce, inhibit, or prevent migration of the catalyst material. Thus, in certain embodiments, the coupling agents comprise a monomer that contains, or is derived from, titanium. In certain embodiments, the admixture comprises about 10% to about 95%, about 25% to about 90%, or about 30% to about 50% by weight of the one or more coupling agents.

The solvent system comprises any of a number of suitable solvents to appropriately dissolve, disperse, and/or suspend the various components of the admixture. In certain embodiments, the solvent system comprises one or more alcohol solvents. In certain embodiments, the solvent system comprises methanol and/or glycerin (glycerol). In certain embodiments, the admixture comprises about 5% to about 90%, about 10% to about 80%, or about 25% to about 75% by weight of the solvent system.

In certain embodiments, the admixture comprises one or more graft regenerators, which can act as a catalyst to activate or regenerate the graft initiators in solution. The graft regenerator/catalyst functions to ionize metal salts into an appropriate graft initiator (e.g., silver ion). A wide variety of regenerator/catalysts may be utilized in the present invention. In certain embodiments, the one or more regenerators comprise a peroxide compound. Exemplary peroxide compounds include urea peroxide, hydrogen peroxide, benzoyl peroxide, and/or methyl peroxide. In certain embodiments, the admixture comprises about 0.1 to about 100 ppmw of the one or more graft regenerators.

Additives and other components may also be included in the admixture as needed or desired. In certain embodiments, the admixture comprises one or more surfactants, rheology modifiers, and/or fillers. In certain embodiments, the admixture comprises about 0.1% to about 5%, or about 0.2% to about 2% by weight of one or more surfactants.

Chemical Grafting Methods

Grafting generally refers to transplanting one body to another in such a way that new growth can continue. Similarly, as used herein, "chemical grafting" generally refers to the transplantation of monomers to a substrate to improve certain properties of the substrate without any basic changes to the substrate itself. Chemical grafting might be visualized as the growth of "whiskers" onto a substrate material. These whiskers are joined to the substrate by means of a chemical bond. This is in contrast to ordinary "coatings," where the bond between the substrate and the coating is only physical in nature. By chemical grafting, the chemical bond achieves a much higher degree of permanency. Chemical grafting first requires activation of the substrate. Once the substrate as been activated chains of monomers linked by carbon-carbon bonds grow on the substrate, resulting in the whiskers. These whiskers may important new or desirable properties permanently to the substrate without damaging the existing positive properties of the substrate material. Advantageously, the chemical grafting methods according to embodiments of the present invention provides a simplified technique that may not require new equipment or processing steps, such as radiation and pH adjustment, that are required by other chemical grafting techniques. The chemical grafting technique is generally described in an article entitled "Grafting of Polymer by Purely Chemical Means," Polymer News, Volume II, No. 11/12, pp. 19-25, which is incorporated by reference herein.

An exemplary general mechanism for chemical grafting onto a substrate according to one embodiment of the present invention is described below. It should be understood, however, that variations of this mechanism and/or other grafting mechanisms may also be used in accordance with embodiments of the present invention. In essence, the chemical grafting mechanism according to this embodiment comprises of growing polymer chains on a backbone chain of a substrate. The graft polymer chains are formed from monomers, for example vinyl monomers, containing appropriate or desired functionality, including groups such as hydroxyl, carboxyl, epoxy, amide, amine, anhydride, and the like. The series of steps involved in the mechanism of chemical grafting to produce grafted polymer chains on the substrate are represented below (note the term "chemical activator" used in the reactions below refers to the term "graft initiator" used herein):

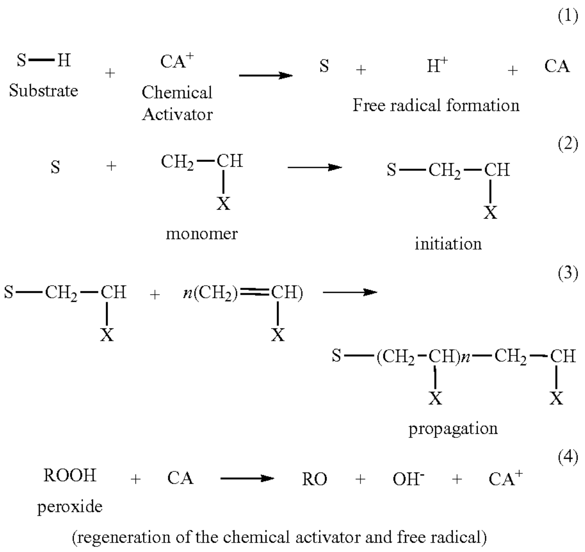

The side functional group X can be selected so as to interact with the substrate or other components within the compositions (e.g., catalyst materials). The chemical activator (i.e., graft initiator) ion begins the reaction, and the subsequent process behaves like an anticatalytic process. A small amount of graft initiator ion (5 to 10 ppm) is therefore sufficient to carry out the process of graft polymerization. The foregoing reactions may take place in the presence of peroxide, which may concurrently regenerate the graft initiator forming a free radical.

Methods of forming a catalyst-containing polymer coating according to embodiments of the present invention include a chemical grafting process such as described herein. The catalytic coating composition is prepared and provided as a liquid composition comprising a washcoat base comprising a catalytic material and an admixture comprising the one or more monomers and/or prepolymers, the one or more grafting initiators, the one or more coupling agents, and any additional components dispersed or dissolved in a solvent system.

The catalytic coating composition may be prepared by combining the washcoat base and admixture and forming a homogeneous mixture. In certain embodiments, the catalytic coating composition comprises about 0.1% to about 10%, or about 0.5% to about 5% by weight of the admixture. In certain embodiments, the catalytic coating composition comprises about 90% to about 99.9%, or about 95% to about 99.5% by weight of the washcoat base.

The provided composition is first applied to the substrate upon which the catalyst-containing coating is formed. As described herein, the compositions, methods, and coatings are particularly useful for catalytic heater applications. Therefore, in certain embodiments, the substrate comprises a heater pad for a catalytic heater device. Such heater pads generally comprise a porous or mesh substrate formed from ceramic or glass fibers. Exemplary ceramic fiber substrates include substrates comprising alumina fibers sold under the name Saffil®. The liquid composition may be applied by any of a number of methods, such as spraying, dipping, or rolling the composition onto the substrate.

The chemical grafting process utilizes the monomers (including coupling agent monomers and other monomers in the admixture) and/or prepolymers as grafting components, along with graft initiators to start and continue the grafting process. To initiate grafting, the surface of the substrate to accept the graft is prepared. The graft initiators and chemical activators described herein are a purely chemical way of exposing active sites on the surface of the substrate to initiate grafting. This may comprise reacting the substrate surface with the one or more grafting initiators to form free radical active sites on the substrate surface. The one or more monomers and/or prepolymers and/or coupling agents can then be chemically bonded to the active sites on the substrate surface.

Polymerization of the monomers and/or prepolymers results in the polymer coating comprising a polymer matrix with the catalyst material interspersed and secured (i.e., chemically bonded) therein. The coupling agents in the polymer coating provide improved adhesion between the polymer matrix polymer chains, the catalyst material, and the substrate fibers, such that the catalyst materials are inhibited or prevented from migrating in the coating upon exposure to high temperatures for prolonged periods, thereby providing a significant advantage over existing catalytic heating systems. Additionally, the penetration of the monomers in the composition (prior to polymerization) is much greater than that of typical coatings comprising pre-formed polymers, and therefore pinhole-free coatings are obtainable by the present methods.

The resulting polymeric coating is chemically bonded to the substrate, rather than merely physically adhered, which imparts the advantageous properties described herein. As with traditional coating techniques, the surface characteristics of a substrate are drastically changed by applying the coating. However, conventional coatings adhere to substrates by simple physical forces, which may easily be broken, peeled, etc. In the case of catalytic heaters, this adherence by simple physical forces may allow the catalyst materials to migrate within the coating layer. Such is not the case with coatings applied by the chemical grafting methods of the present invention. Since the attachment of the coatings is accomplished by forming a chemical, covalent bond, these coatings can provide extended life and superior adhesion. Although, the chemical reaction that takes place on the surface of the substrate provides a monomolecular (thin) layer of chemically bonded coating, the thickness of the coating can be increased as desired by polymerization to "grow" the whiskers and resulting polymer matrix of the coating.

Applications

Embodiments of the present invention are also directed to catalytic heaters comprising a catalyst-containing polymer coating chemically bonded to a substrate. In certain such embodiments, the substrate is a heater pad for a catalytic heater device. In particular embodiments, the chemical grafting of monomers and/or prepolymers, in combination with chemical coupling, provides a strongly bonded platinum (or other catalyst) containing coating to the catalytic heater. The compositions and methods described herein result in a coating layer that inhibits or prevents migration of catalytic materials, thereby maintaining catalytic activity and reducing temperature drop over time, as compared to traditional systems.

Although the present invention is described with particular application to catalytic heater devices and systems, embodiments of the present invention may include chemical grafting one or more of a multitude of monomers with various substrates, which may impart similar advantages to those described herein. For example, in certain embodiments, the compositions may be applied to alumina and/or silica substrates and chemically grafted as described herein to form catalyst-containing coatings on the substrates for use in any suitable catalyst reaction environment.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth compositions prepared in accordance with the invention. It is to be understood, however, that these examples are provided by way of illustration and nothing therein should be taken as a limitation upon the overall scope of the invention.

Example I

Admixture Formulation A was prepared according to Table 1 below. 0.5%-1.0% (12.5 grams to 5.6 grams) of Formulation A was mixed with 558 grams of a washcoat base comprising hexachloroplatinate, Chemetall 494006-Rinsite, and tap water to form a catalyst-containing liquid coating composition.

TABLE 1

Formulation A.

| Component | Parts by Weight |
|---|---|
| Methanol | 25.00 |
| Fluro Surfactant FC 4430 | 1.00 |
| Titanate Coupling Agent (Ethyl Diamino Ethyl Titanate) | 225.00 |
| Monomer Silane A1120 | 0.20 |
| Monomer Dynasylan 1505 | 0.10 |
| Urea Peroxide 0.1% Solution in Methanol | 0.01 |
| Silver Perchlorate 0.1% Solution in Methanol | 0.01 |

Example II

Admixture Formulation B was prepared according to Table 2 below. 3% (17 grams) of Formulation B was mixed with 558 grams of a washcoat base comprising hexachloroplatinate, Chemetall 494006-Rinsite, and tap water to form a catalyst-containing liquid coating composition.

TABLE 2

Formulation B.

| Component | Parts by Weight |
|---|---|
| Glycerin | 200.00 |
| Methanol | 200.00 |
| Surfactant ND-10 | 5.00 |
| Titanate Coupling Agent (Isopropyl N-ethylene Diamino Ethyl Titanate) | 200.00 |
| Gama Amino Triethoxy Silane A1100 | 1.00 |
| Urea Peroxide 0.1% Solution in Methanol | 0.01 |
| Silver Perchlorate 0.1% Solution in Methanol | 0.01 |

Example III

Admixture Formulation C was prepared according to Table 3 below. 3% (17 grams) of Formulation C was mixed with 558 grams of a washcoat base comprising hexachloroplatinate, Chemetall 494006-Rinsite, and tap water to form a catalyst-containing liquid coating composition.

TABLE 3

| Formulation C. | |
|---|---|
| Component | Parts by Weight |
| Glycerin | 100.00 |
| Methanol | 100.00 |
| Fluro Surfactant FC 4430 | 1.00 |
| Titanate Coupling Agent (Isopropyl Triethylene Diamino Ethyl Titanate) | 100.00 |
| Monomer Silane A1120 | 0.40 |
| Monomer Dynasylan 1505 | 0.10 |
| Urea Peroxide 0.1% Solution in Methanol | 0.01 |
| Silver Perchlorate 0.1% Solution in Methanol | 0.01 |

We claim:

1. A method of forming a catalyst-containing polymer coating on a catalytic heater substrate, the method comprising:

providing a liquid coating composition comprising:

a washcoat base comprising a catalyst material, wherein the catalyst material comprises a hexachloroplatinate salt, and a chemical grafting admixture comprising one or more monomers and/or prepolymers, one or more grafting initiators, and one or more coupling agents dispersed or dissolved in a solvent system; and applying the liquid coating composition to a surface of the substrate and forming the catalyst-containing polymer coating thereon.

2. The method of claim 1, wherein forming the catalyst-containing polymer coating on the substrate comprises:

reacting the substrate surface with the one or more grafting initiators to form free radical active sites on the substrate surface;

chemically bonding the one or more monomers and/or prepolymers and/or coupling agents to the active sites on the substrate surface; and polymerizing the monomers and/or prepolymers to form a polymer matrix comprising the catalyst material secured therein.

3. The method of claim 1, wherein the one or more monomers and/or prepolymers comprise vinyl, epoxy, and/or acrylic monomers.

4. The method of claim 1, wherein the one or more monomers and/or prepolymers comprise hydroxyl, chloro, carboxyl, or glycidyl groups.

5. The method of claim 1, wherein the one or more graft initiators comprise one or more metallic salts selected from the group consisting of silver nitrate, silver perchlorate, ferrous ammonium sulfate, silver acetate, copper acetate, and combinations thereof.

6. The method of claim 1, wherein the one or more coupling agents comprises one or more titanate salts comprising two or more amino groups.

7. The method of claim 1, wherein the admixture further comprises a grafting regenerator.

8. The method of claim 7, wherein the grafting regenerator comprises a peroxide compound.

9. The method of claim 1, wherein the substrate comprises ceramic fibers.

10. The method of claim 1, wherein the solvent system comprises methanol and/or glycerol.

* * * * *